Oct. 27, 1931.     B. WHEELER     1,829,464

LOCOMOTIVE TRUCK

Filed Dec. 19, 1930     2 Sheets-Sheet 1

INVENTOR
*Brian Wheeler.*

BY
*Wesley G. Carr*
ATTORNEY

Witnesses.
*E. A. McCloskey.*
*George V. Woodling.*

Oct. 27, 1931.  B. WHEELER  1,829,464
LOCOMOTIVE TRUCK
Filed Dec. 19, 1930  2 Sheets-Sheet 2
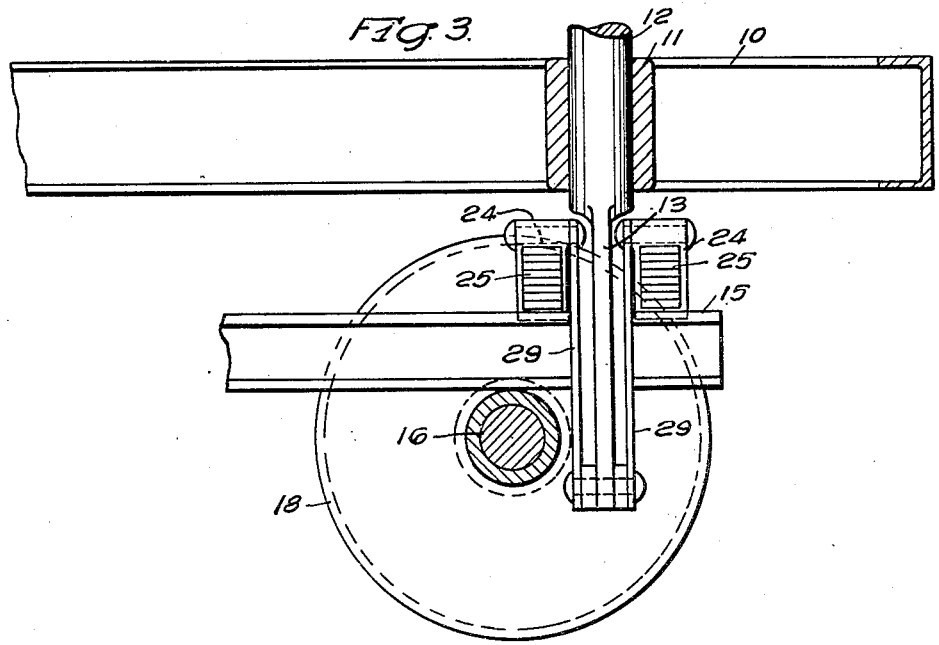
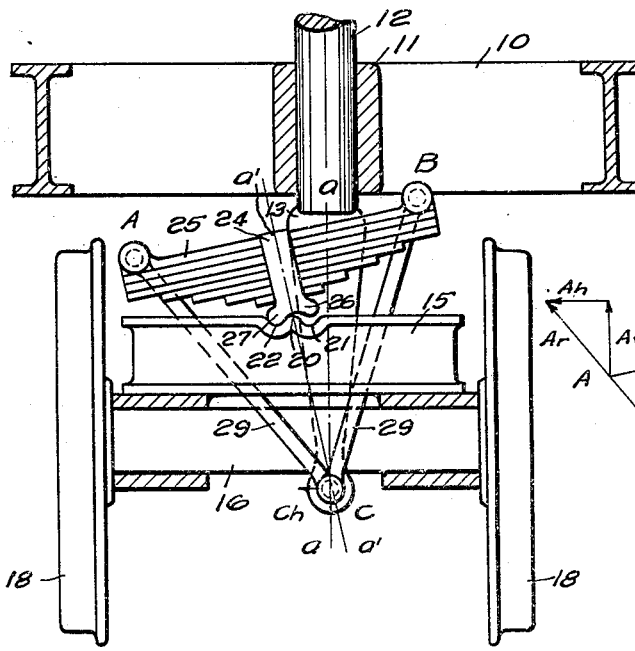
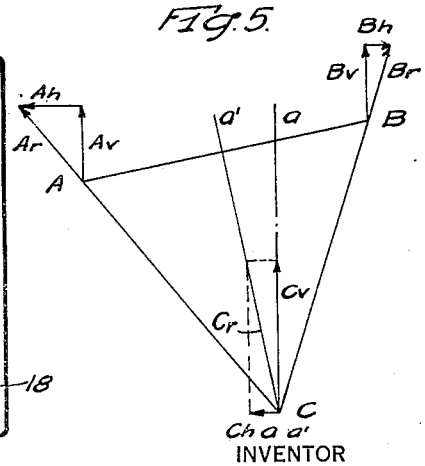
INVENTOR
Brian Wheeler.
Witnesses
BY
ATTORNEY Patented Oct. 27, 1931

1,829,464

UNITED STATES PATENT OFFICE

BRIAN WHEELER, OF WILKINSBURG, PENNSYLVANIA, ASSIGNOR TO WESTINGHOUSE ELECTRIC & MANUFACTURING COMPANY, A CORPORATION OF PENNSYLVANIA

LOCOMOTIVE TRUCK

Application filed December 19, 1930. Serial No. 503,441.

My invention relates generally to locomotives and, more particularly, to locomotive trucks.

The object of my invention, generally stated, is the provision of a truck for a locomotive that shall be simple and efficient in operation and readily and economically manufactured and installed.

A more specific object of my invention is to provide for guiding the movements of the locomotive super-structure to prevent the imposing of an excessive side thrust on the main driving wheels when the locomotive is moving on a curved track.

A further object of my invention is to provide a connection between the axle and the super-structure of a locomotive which permits the locating of the resilient member of the connection in a position to permit it to be made of a length which will give the desired resilience.

Other objects of the invention will, in part, be obvious and will, in part, appear hereinafter.

The invention is disclosed in the embodiment thereof shown in the accompanying drawings and comprises the structural features, the combination of elements and the arrangement of parts that will be exemplified in the structure hereinafter set forth, and the scope of the application of which will be indicated in the claims.

Figure 1:
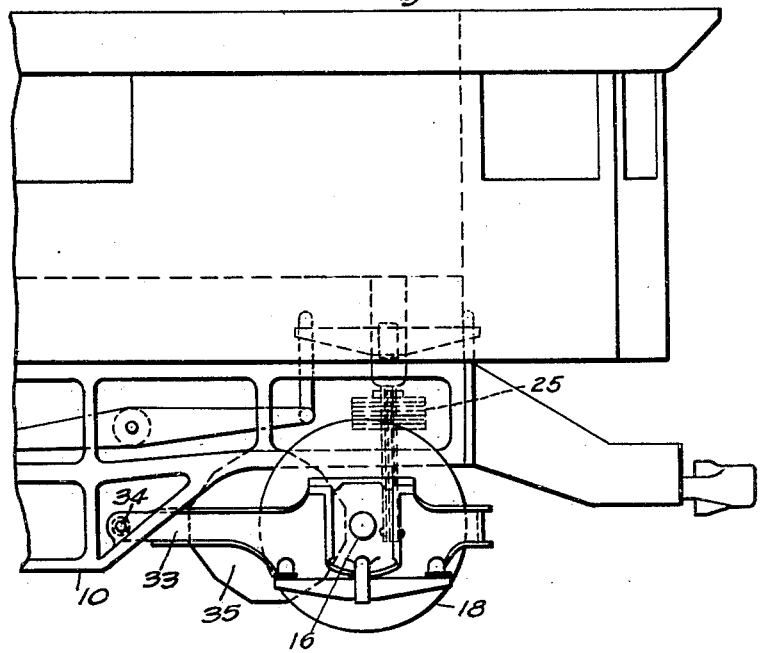
Figure 2:
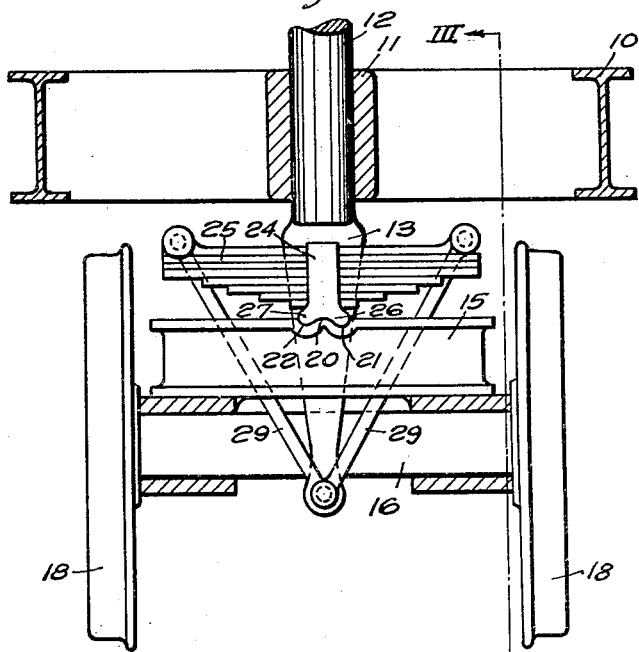

For a fuller understanding of the nature and objects of the invention, reference should be had to the following detailed description, taken in connection with the accompanying drawing, in which:

Figure 1 is a view, in side elevation, of a portion of an electric locomotive showing a truck embodying the features of my invention, Fig. 2 is a view, in end elevation, of a truck showing the members of the connection for supporting the locomotive super-structure on the truck frame, Fig. 3 is a view, partially in side elevation and partially in section, taken along the line III—III of Fig. 2;

Fig. 4 is a view, in end elevation, of a truck, such as is illustrated in Fig. 2, showing the relative positions of the members of the connection when the truck is displaced from its central position, as it will be, when the locomotive is moving on a curved track, and Fig. 5 is a vector diagram representing the magnitude and the direction of the forces set up in the members of the connection when the truck is displaced, as shown in Fig. 4.

Referring now to the drawings, 10 designates a locomotive super-structure provided with a center-pin bearing 11 for the reception of a center pin 12. As shown, the center pin 12 is provided with an elongated head 13 which depends from the locomotive super-structure.

The wheels 18 and the axle 16, which carry the truck 15, are of the type commonly utilized in locomotive construction. As illustrated in Fig. 1, a tail piece 33, is carried by the truck 15 and is fulcrumed, in the usual manner, to the locomotive super-structure 10 at a point 34. The tail piece 33 and the truck 15 constitute a support for a motor 35 which is connected to the axle 16 by a train of gears.

As will be noted, the truck 15 has two spaced depressed bearing surfaces 21 and 22 which form a seat 20 to receive projections 26 and 27 provided on support 24. Since the support 24 is merely superimposed on the truck, it may oscillate when subjected to predetermined side thrusts, such as are encountered when the locomotive is moving on a curved track. However, the structural features of the seat 20 and the supports 24 are not limited to the preferred forms illustrated in the accompanying drawings but may be designed with any desired physical features to meet operating conditions. As will be observed in Fig. 3, the supports 24 carry leaf springs 25 of the ordinary type, which are mounted to extend transversely of the truck 15 and are disposed on opposite sides of the center-pin head 13. It is to be understood that, in designing locomotives, some latitude is allowed for locating the springs 25. For instance, the springs 25 may be located on one side only of the center-pin head 13 and mounted either above or below the axle 16. The supporting members 29 of the connection depend from the ends of the springs 25 and are pivotally connected to the lower end of the center-pin head 13.

As will be observed from an examination of Fig. 4, when the locomotive super-structure moves laterally relative to the truck 15, there is substantially no lateral movement of the spring 25. The movement of the springs is an oscillatory one about a point in the seat 20, and the arc in which the end of spring moves is substantially a vertical line. Therefore, with this type of structure, a longer spring having greater resilience can be provided than is utilized in other types of locomotive trucks, because in prior art structures, the spring and truck may be given a lateral relative movement which necessitates making the spring shorter than the distance between the truck wheels by a length equal to the clearances and throw of the relative lateral movement.

In operation, when the locomotive is moving on a curved track, the truck 15 is moved laterally carrying the supports 24 and the springs 25 with it. At the same time, the locomotive super-structure 10 prevents the center-pin head 13 from moving laterally with the truck 15 and thus the supporting members 29 cause the springs 25 and the supports 24 to take the relative positions shown in Fig. 4.

Referring to Fig. 5, which is a vector diagram of the forces set up in the members of the connection when the locomotive is moving on a curved track, it will be noted that resultant forces $Ar$, $Br$ and $Cr$ are set up, respectively, at points A, B and C. The resultant force $Ar$ is resolved into a horizontal force of magnitude $Ah$ and a vertical force of magnitude $Av$. Similarly, the resultant forces $Br$ and $Cr$, at points B and C, are resolved into horizontal forces of magnitude $Bh$ and $Ch$, respectively, and vertical forces of magnitude $Br$ and $Cr$, respectively. By reason of the relative positions of the members of the connection, the horizontal force $Ah$ is greater in magnitude than the horizontal force $Bh$ and of the opposite direction. Therefore, in order for the members of the connection to be in equilibrium, a horizontal force $Ch$ is set up at point C having a magnitude equal to the difference between the horizontal force $Ah$ and the horizontal force $Bh$ and a direction opposite to force $Bh$. The horizontal force $Ch$ acts as a guiding force for guiding the movements of the locomotive super-structure which prevents the imposing of an excessive side thrust on the driving wheels when the locomotive is moving on a curved track.

I would state, in conclusion, that, while the illustrated example constitutes a practical embodiment of my invention, I do not limit myself strictly to the exact details herein illustrated, since modifications of the same may be varied considerably without departing from the spirit of the invention as defined in the appended claims.

I claim as my invention:

1. A connection for supporting a locomotive center-pin head on a truck frame comprising, in combination, a support having spaced projections for seating on the truck frame to oppose oscillatory movements of the connection, a spring carried by the support, and supporting members carried by the ends of the spring and connected to the center-pin head.

2. A connection for supporting a locomotive center-pin head on the truck frame comprising, in combination, a support having spaced projections for seating on the truck frame to oppose oscillatory movements of the connection, a spring carried by the support and disposed above the truck frame, and supporting members depending from the ends of the spring and connected to the center-pin head.

3. A connection for supporting a locomotive center-pin head on the truck frame comprising, in combination, a support having spaced projections for seating on the truck frame to oppose oscillatory movements of the connection, a spring carried by the support and disposed above the truck frame, and supporting members depending from the ends of the spring and connected, at a point below the support for the spring, to the center-pin head.

4. A connection for supporting a locomotive super-structure on the truck frame comprising, in combination, supports having spaced projections for seating on the truck frame to oppose oscillatory movement of the connection, springs carried by the supports and disposed at spaced longitudinal distances, a center-pin head disposed to carry the locomotive super-structure and depending intermediate said springs, and supporting members mounted on the ends of the springs and connected to the center-pin head.

5. A connection for supporting a locomotive super-structure on the truck frame comprising, in combination, supports having spaced projections for seating on the truck frame to oppose oscillatory movement of the connection, springs carried by the supports and disposed above the truck frame at spaced longitudinal distances, a center-pin head disposed to carry the locomotive super-structure and depending intermediate said springs and supporting members mounted on the ends of the springs and connected to the center-pin head.

6. A connection for supporting a locomotive super-structure on the truck frame comprising, in combination, supports having spaced projections for seating on the truck frame to oppose oscillatory movement of the connection, springs carried by the supports and disposed above the truck frame at spaced longitudinal distances, a center-pin head disposed to carry the locomotive super-structure and depending intermediate said springs, and supporting members mounted on the ends of the springs and connected, at a point below the support for the spring, to the center-pin head.

7. A connection for supporting a locomotive center-pin head on a truck frame comprising, in combination, a support making engagement with the truck frame, a spring carried by the support and supporting members mounted on the ends of the spring and connected to the center-pin head.

8. A connection for supporting a locomotive center-pin head on a truck frame comprising, in combination, a support making engagement with the truck frame, a spring carried by the support, said spring being disposed above the truck frame, and supporting members mounted on the ends of the spring and connected to the center-pin head.

9. A connection for supporting a locomotive center-pin head on a truck frame comprising, in combination, a support making engagement with the truck frame, a spring carried by the support, said spring being disposed above the truck frame, and supporting members mounted on the ends of the spring and connected, at a point below the support for the spring, to the center-pin head.

10. A connection for supporting a locomotive center-pin head on a truck frame comprising, in combination, a support making a plurality of engagements with the truck frame, a spring carried by the support, and supporting members mounted on the ends of the spring and connected to the center-pin head.

11. A connection for supporting a locomotive center-pin head on a truck frame comprising, in combination, a support making a plurality of engagements with the truck frame, a spring carried by the support, said spring being disposed above the truck frame, and supporting members mounted on the ends of the spring and connected to the center-pin head.

12. A connection for supporting a locomotive super-structure on a truck frame comprising, in combination, supports making engagement with the truck frame, springs carried by the supports, said springs being disposed at spaced longitudinal distances, a center-pin head disposed to carry the locomotive super-structure and depending intermediate said springs, and supporting members mounted on the ends of the spring and connected to the center-pin head.

13. A connection for supporting a locomotive super-structure on a truck frame comprising, in combination, supports making engagement with the truck frame, springs carried by the supports, said springs being disposed above the truck frame at spaced longitudinal distances, a center-pin head disposed to carry the locomotive super-structure and depending intermediate said springs, and supporting members mounted on the ends of the spring and connected to the center-pin head.

14. A connection for supporting a locomotive super-structure on a truck frame comprising, in combination, supports making a plurality of engagements with the truck frame, springs carried by the supports, said springs being disposed at spaced longitudinal distances, a center-pin head disposed to carry the locomotive super-structure and depending intermediate said springs, and supporting members mounted on the ends of the spring and connected to the center-pin head.

15. A connection for supporting a locomotive super-structure on a truck frame comprising, in combination, supports making a plurality of engagements with the truck frame, springs carried by the supports, said springs being disposed above the truck frame at spaced longitudinal distances, a center-pin head disposed to carry the locomotive super-structure and depending intermediate said springs, and supporting members mounted on the ends of the spring and connected to the center-pin head.

In testimony whereof, I have hereunto subscribed my name this 12th day of December, 1930.

BRIAN WHEELER.